US012297681B2

(12) United States Patent
Hooke

(10) Patent No.: US 12,297,681 B2
(45) Date of Patent: May 13, 2025

(54) ROLLER ASSEMBLY

(71) Applicant: Anthony Innovations Pty Ltd., Thomastown (AU)

(72) Inventor: Oscar Humphrey Richard Hooke, Thomastown (AU)

(73) Assignee: Anthony Innovations Pty Ltd., Thomastown (AU)

(*) Notice: Subject to any disclaimer, the term of this patent is extended or adjusted under 35 U.S.C. 154(b) by 0 days.

(21) Appl. No.: 17/881,876

(22) Filed: Aug. 5, 2022

(65) Prior Publication Data

US 2023/0039186 A1 Feb. 9, 2023

(30) Foreign Application Priority Data

Aug. 6, 2021 (AU) ................................ 2021902435

(51) Int. Cl.

*E05D 15/56* (2006.01)
*E05D 15/06* (2006.01)
*E06B 7/16* (2006.01)
*E06B 3/46* (2006.01)

(52) U.S. Cl.

CPC ....... *E05D 15/565* (2013.01); *E05D 15/0665* (2013.01); *E06B 7/16* (2013.01); *E05Y 2201/474* (2013.01); *E05Y 2201/64* (2013.01); *E05Y 2201/688* (2013.01); *E05Y 2900/132* (2013.01); *E05Y 2900/148* (2013.01); *E06B 3/4609* (2013.01); *E06B 3/4636* (2013.01)

(58) Field of Classification Search

CPC .............. E05D 15/565; E05D 15/0665; E05D 15/0669
USPC .................................................. 16/87 R–107
See application file for complete search history.

(56) References Cited

U.S. PATENT DOCUMENTS 3,169,574 A * 2/1965 Behlen ................ E05D 15/0665 160/368.1
3,283,444 A * 11/1966 Andrews ............. E05D 15/0669 49/420
3,722,028 A * 3/1973 Schoenbrod .......... E05D 15/066 49/420
3,731,431 A * 5/1973 Banner ............... E05D 15/0669 49/420
3,879,893 A * 4/1975 Helmick ............. E05D 15/0665 49/420

(Continued)

FOREIGN PATENT DOCUMENTS

DE 102016212793 A1 * 1/2018 ........... E05D 15/565
WO WO-2013154833 A1 * 10/2013 ............. B60J 5/047

OTHER PUBLICATIONS

Machine translation of DE102016212793A1.*

*Primary Examiner* — Marcus Menezes
(74) *Attorney, Agent, or Firm* — David L. Nocilly; Bond Schoeneck & King PLLC

(57) ABSTRACT

Disclosed herein is a roller assembly for a sliding panel, the roller assembly including at least one roller sub-assembly having at least one roller wheel, the roller sub-assembly comprising at least one pivotal arm and a roller wheel rotatably mounted to the arm, wherein one end of the arm is configured for pivotally attachment to the support to permit the arm and roller wheel to pivot relative to the support in a vertical plane and the opposite end of the arm has resilient suspension means configured to allow resilient pivotal movement of said opposite end relative to the support when a force is applied to the roller wheel.

12 Claims, 14 Drawing Sheets

(56) References Cited

U.S. PATENT DOCUMENTS

| | | | | |
|---|---|---|---|---|
| 4,282,631 | A * | 8/1981 | Uehara | E05D 15/0665<br>16/105 |
| 2005/0012816 | A1 * | 1/2005 | Becken | E05D 15/0665<br>348/107 |
| 2005/0230068 | A1 * | 10/2005 | Green | E06B 3/4609<br>160/371 |
| 2009/0077766 | A1 * | 3/2009 | Proctor | E05D 15/0665<br>16/97 |
| 2010/0307064 | A1 * | 12/2010 | Lambertini | E05D 15/565<br>49/427 |
| 2018/0058122 | A1 * | 3/2018 | Lang | E06B 3/46 |
| 2019/0071910 | A1 * | 3/2019 | Alban | E05D 15/0665 |
| 2020/0157865 | A1 * | 5/2020 | Terno | E05D 15/0665 |
| 2020/0408016 | A1 * | 12/2020 | Hernandez | E05D 15/0665 |
| 2022/0325568 | A1 * | 10/2022 | Marega | E05D 15/101 |
| 2023/0085323 | A1 * | 3/2023 | Hooke | E05D 15/565<br>49/303 |
| 2023/0175298 | A1 * | 6/2023 | Scorcia | E05D 15/0665<br>16/91 |

* cited by examiner

ROLLER ASSEMBLY

RELATED APPLICATION

This application claims priority to Australian provisional patent application no. 2021902435 entitled 'A roller assembly' filed on 6 Aug. 2021.

FIELD OF THE INVENTION

The present invention generally relates a roller assembly for supporting a slidable panel and a suspension system comprising at least one said roller assembly.

BACKGROUND TO THE INVENTION

Conventional roller assemblies for sliding panels have roller wheels within carriages that are located within a cavity of the panel. These assemblies will typically have two roller wheel carriages, with one located towards the lower front corner and one towards the lower rear corner of the sliding panel.

Other roller assemblies exist for low or slim line sliding panel systems which have rollers mounted in the sill of the door or window frame. One purpose of these systems is to reduce the outer frame size of the panel, for example to enable larger glass sections to maximize outdoor views and natural light. However, these systems have limited room in the sill and therefore the roller wheels are of smaller diameter than those commonly used in conventional panel mounted carriages. The reduced wheel size places a limit on the mass that each roller can bear. Thus, more than two rollers are required at spaced apart intervals in the sill in order to spread the weight of the panel between the rollers.

A problem with existing sliding door and window rollers is that for even load distribution between rollers within the panel, the load must be applied between only two equidistant positions. In a system with only two wheels, these points are usually the axles. When loads increase, additional wheels are required to support the increased load, which then requires additional mechanisms to ensure the load is still applied through the two equidistant positions. These additional mechanisms increase in complexity as door loads increase and quantity of wheels required increases. Increasing the complexity of the mechanism increases costs.

In sliding panels with multiple wheels not all the wheels will be evenly in contact with the rolling surface to the same degree, such that one or more of the wheels may receive a greater force from the panel than others. This problem can arise because the sill is often not perfectly level, for example through curvature in the sill or door/window frame. This problem can also be caused by the panel itself not having a perfectly straight edge, such as where the panel is assembled on an uneven surface. As a result, the weight of a panel may not be evenly distributed between the roller wheels. This can lead to performance issues, such as a sliding motion of the panel not being smooth or the panel being difficult to move. In some cases, this problem can lead to too high a percentage of the weight of the panel being received by a single wheel, which can lead to failure or buckling of the wheel such that the sliding panel will not function.

It is desirable for embodiments of the present invention to address at least partially one or more of the disadvantages of the methods or systems above. Further it is preferred that embodiments of the present invention provide a system and method which has improved performance for sliding door panels, particularly for heavier doors and windows and/or less ideal conditions such as uneven sills or panel edges. It is also preferred that embodiments of the present invention also produce a system which can accommodate a wide range of sliding doors and windows having different weights.

It is to be understood that, if any prior art publication is referred to herein, such reference does not constitute an admission that the publication forms a part of the common general knowledge in the art, in Australia or any other country.

SUMMARY OF THE INVENTION

According to an aspect of the present invention there is provided a roller assembly for a sliding panel, the roller assembly including at least one roller sub-assembly having at least one roller wheel, the at least one roller sub-assembly comprising at least two pivotal arms where each arm has a roller wheel rotatably mounted to the respective arm, wherein one end of each of the at least two arms is configured for pivotally attachment to a support to permit the arm and its associated roller wheel to pivot relative to the support in a vertical plane and the opposite end of the arm has resilient suspension means configured to allow resilient pivotal movement of said opposite end relative to the support when a force is applied to the at least one roller wheel such that each pivotal arm, resilient suspension means and associated wheel forms its own suspension arrangement.

The or each respective arm can comprise a pair of spaced-apart plate-like members and the or each roller wheel is rotatably mounted on an axis therebetween the plate-like members. Preferably the or each roller wheel is rotatably mounted intermediate the ends of its respective arm.

The roller assembly can further comprise an outer housing which contains a plurality of roller wheels. Preferably the roller sub-assembly can be one of a pair of sub-assemblies within the outer housing of the roller assembly.

In one embodiment, the support of each roller sub-assembly is configured to hold two roller wheels in edge-to-edge configuration, each roller wheel being carried by a respective arm. Preferably, the arms of the sub-assembly are configured to pivot relative to the support in a vertical plane about a common pivot point, the arms extending outwardly from the pivot point, and the suspension means being located at opposite end portions of the support.

In another embodiment, the support of the roller sub-assembly can be configured to hold four roller wheels in edge-to-edge configuration, each roller wheel being carried by a respective arm and having suspension means at the end portion of each said respective arm. Preferably, the suspension means is a spring. More preferably, the suspension means is a coil spring.

It will, however, be appreciated that the support of the or each roller assembly may be configured to hold any number of wheels, which may or may not be in edge-to-edge configuration.

In an embodiment, at least one of the roller sub-assemblies can be configured to be removable from the outer housing and/or replaceable.

According to a further aspect of the present invention there is provided a roller cartridge for mounting in a roller assembly for a sliding panel system, the roller cartridge including at least two pivotal arms and a roller wheel associated with each of the at least two pivotal arms, wherein one end of the pivotal arm is configured to be pivotally mounted to a support of the roller assembly, and the opposite end of the arm is provided with suspension means, and wherein the roller cartridge is configured to be removable and/or replaceable from the roller assembly such that each pivotal arm, resilient suspension means and associated wheel forms its own suspension arrangement.

According to a yet further aspect of the present invention there is provided a sealing system for a slidable panel, the assembly comprising a linkage assembly which connects a handle and at least one roller assembly as described above, the sealing system being configured to be adjustable, by manipulation of the handle, such that the at least one roller assembly and the slidable panel supported thereby are movable between a first position where the slidable panel is in contact with sealing means thereby providing weatherproofing and a second position where the slidable panel is free of the sealing means and the panel is able to move freely relative to an outer frame.

The linkage assembly can be configured to as to provide a variable force when the roller assembly and supported panel is moved between the positions.

According to still yet another aspect of the present invention there is provided a sealing system for a sliding panel assembly as described above having at least a pair of roller assemblies as described above, wherein the each of the roller assemblies being spaced apart and mountable in the recess of a sill for supporting the slidable panel.

BRIEF DESCRIPTION OF THE DRAWINGS

One or more embodiments of the present invention will hereinafter be described with reference to the accompanying Figures, in which.

DETAILED DESCRIPTION OF THE DRAWINGS

Figure 1:
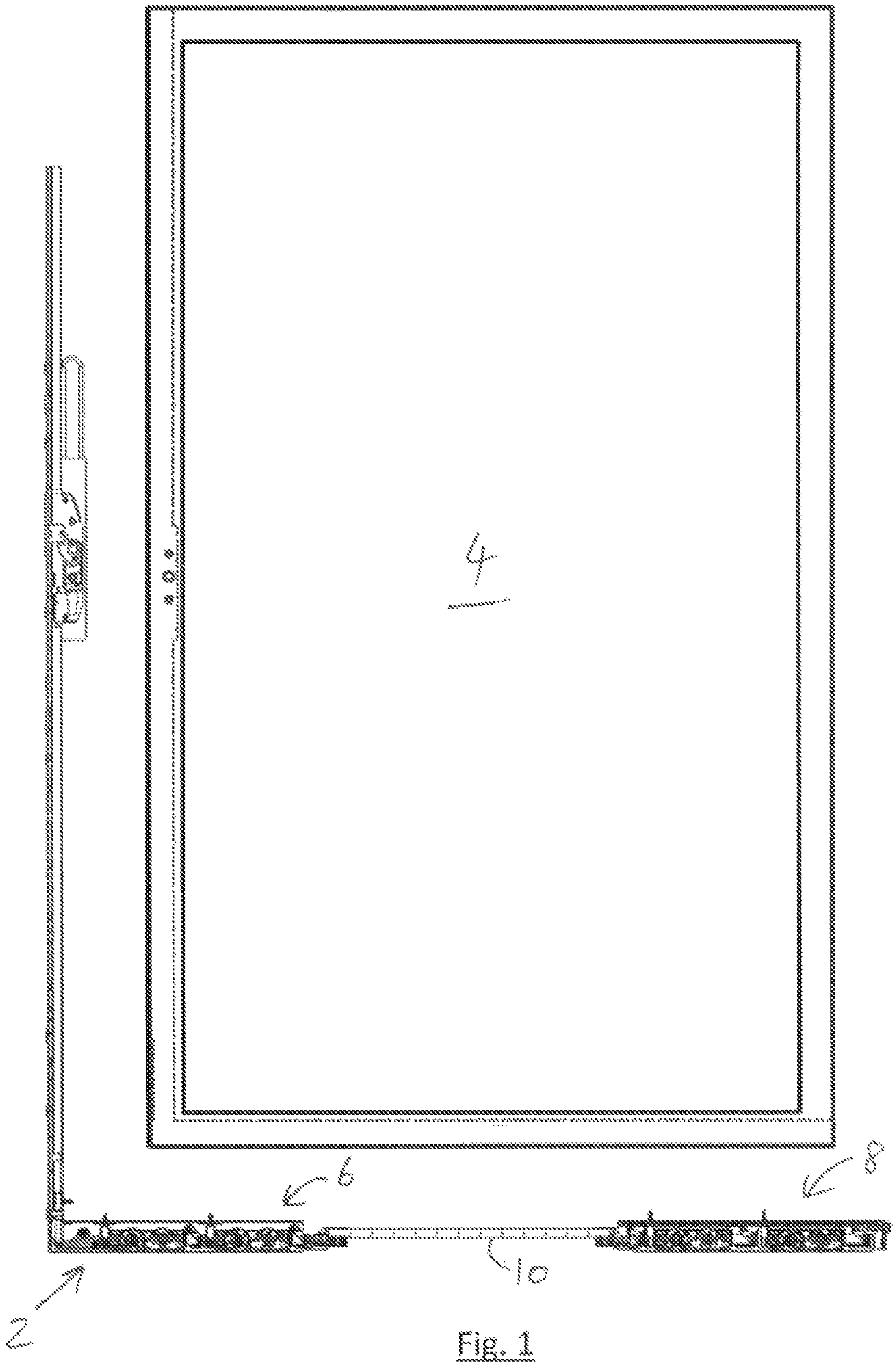
FIG. 1 is a front view of a sliding panel system having a pair of tandem roller assemblies being a sealing assembly according to a preferred embodiment of the present invention.
Figure 2:
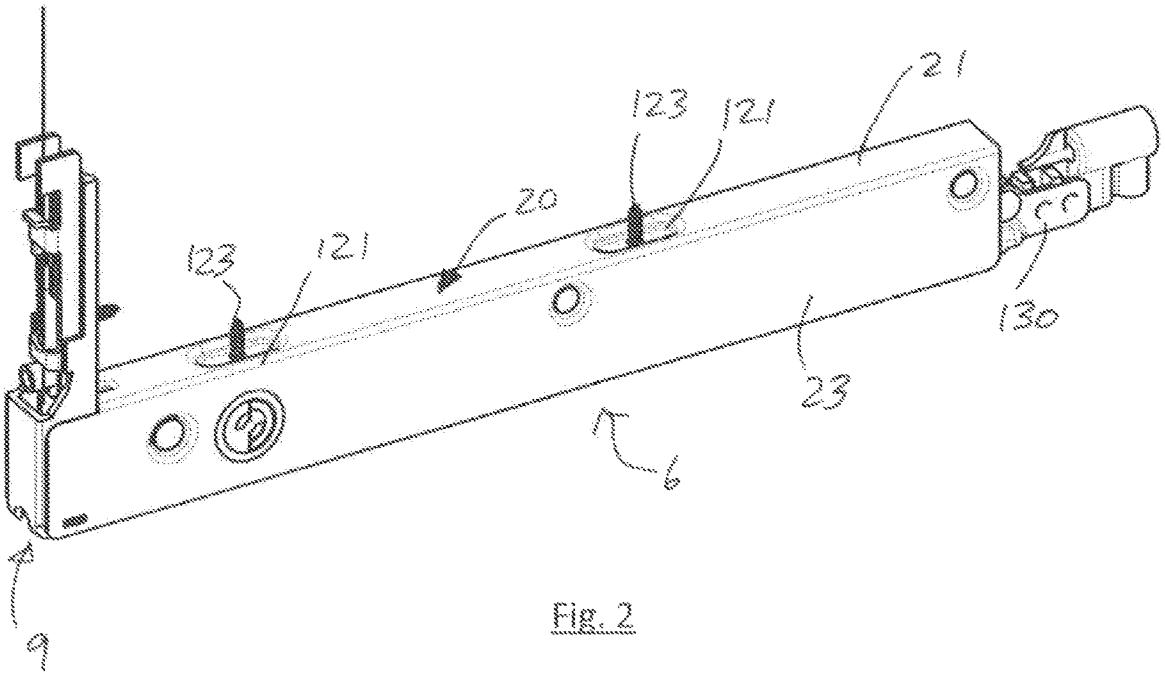
FIG. 2 is a perspective view of a first roller assembly of the sliding panel system.
Figure 3:
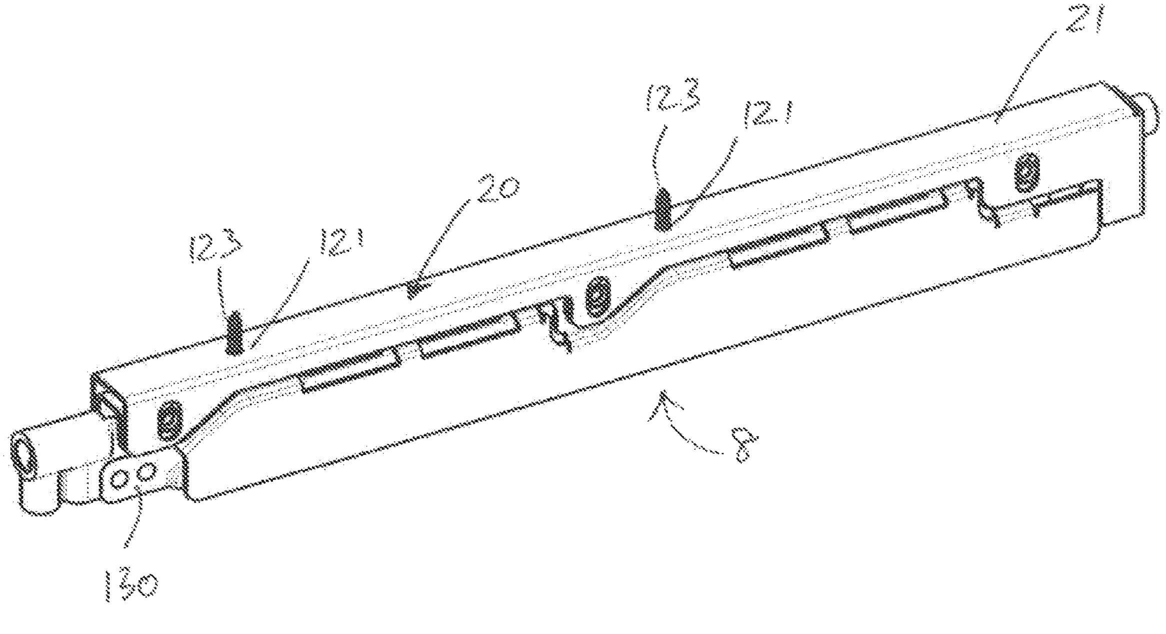
FIG. 3 is a perspective view of a second roller assembly of the sliding panel system.
Figure 4:
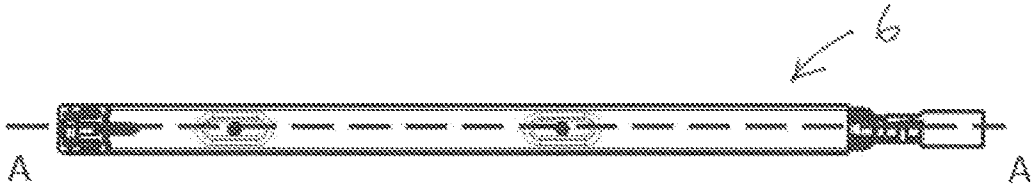
FIG. 4 is a top view of the first roller assembly of FIG. 2.
Figure 5:
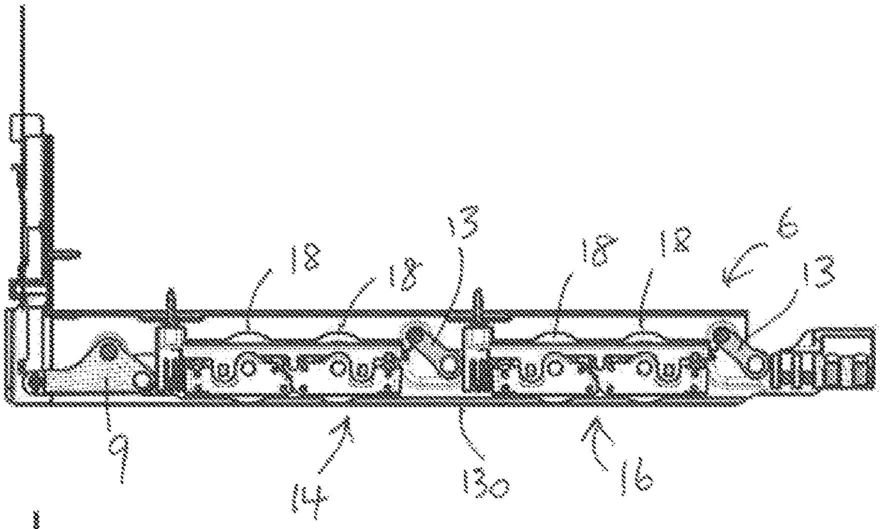
FIG. 5 is a cross-section view through line A-A of FIG. 4 of the first roller assembly in a retracted configuration.
Figure 6:
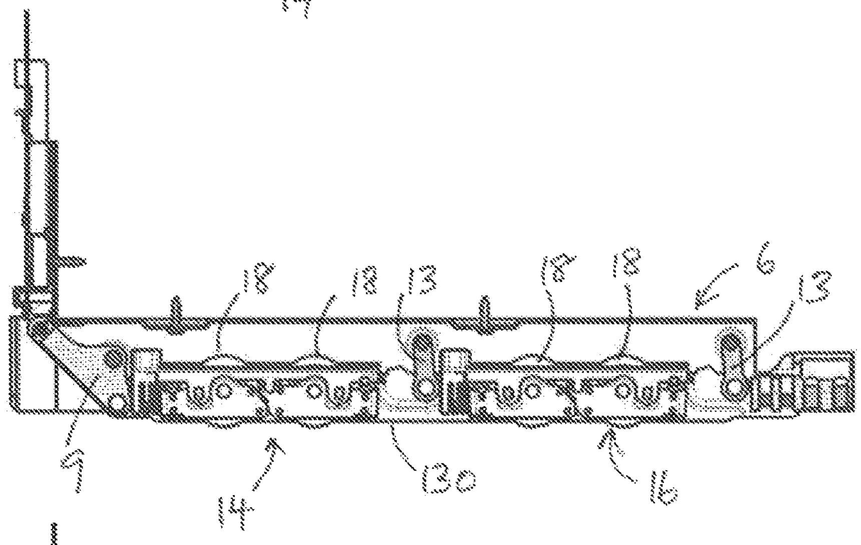
FIG. 6 is a cross-section view through line A-A of FIG. 4 of the first roller assembly of in an extended configuration.
Figure 7:
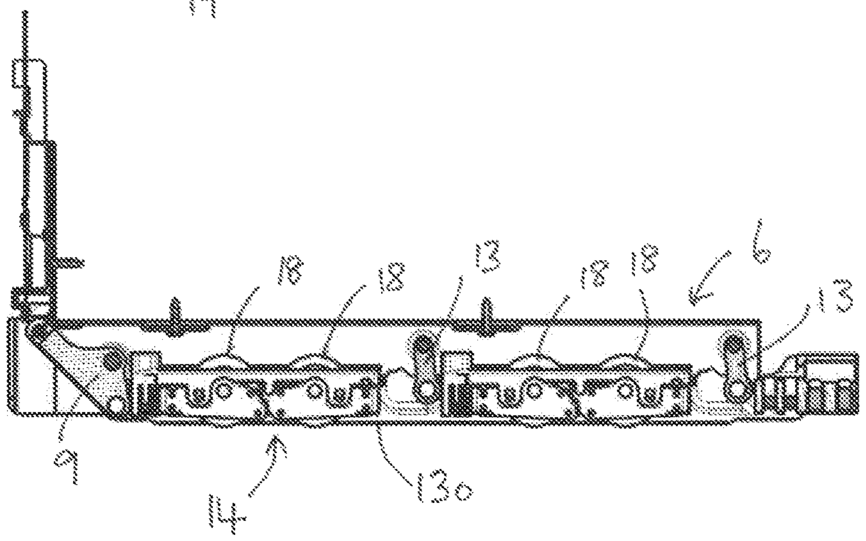
FIG. 7 is a cross-section view through line A-A of FIG. 4 of the second sub-assembly in an extended and loaded condition.
Figure 8:
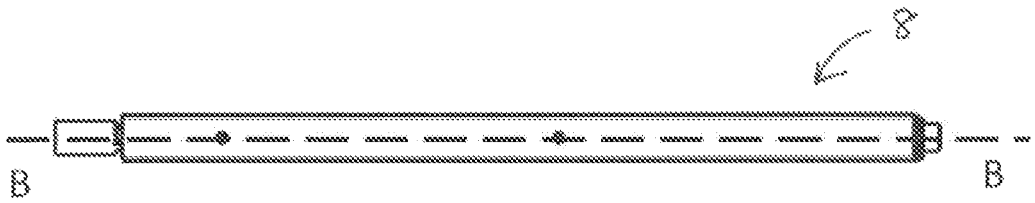
FIG. 8 is a top view of the second roller assembly of FIG. 3.
Figure 9:
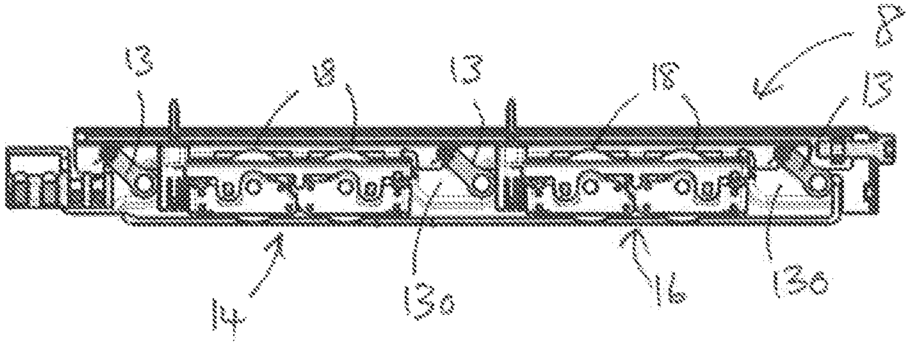
FIG. 9 is a cross-section view through line B-B of FIG. 8 of the second roller assembly in a retracted configuration.
Figure 10:
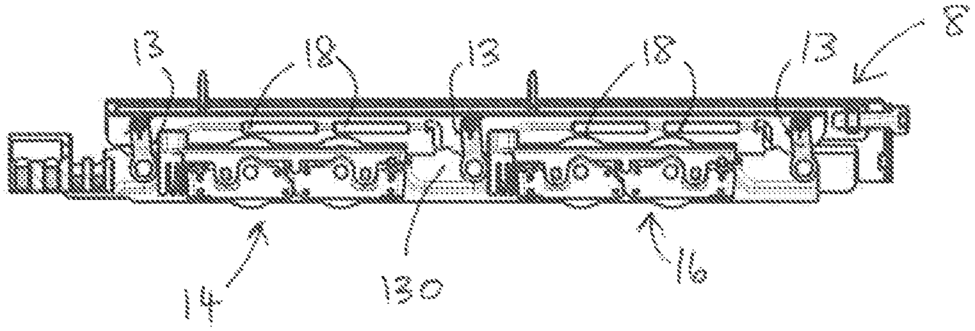
FIG. 10 is a cross-section view through line B-B of FIG. 3 of the second roller assembly in an extended configuration.
Figure 11:
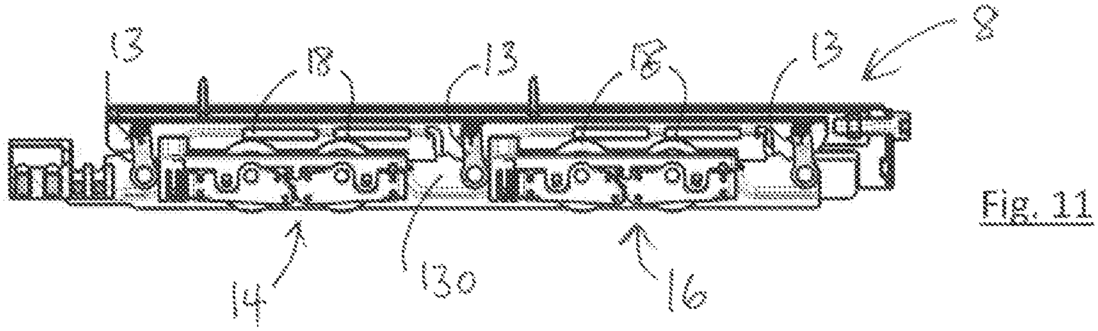
FIG. 11 is a cross-section view through line B-B of FIG. 3 of the second roller assembly in an extended and loaded condition.
Figure 12:
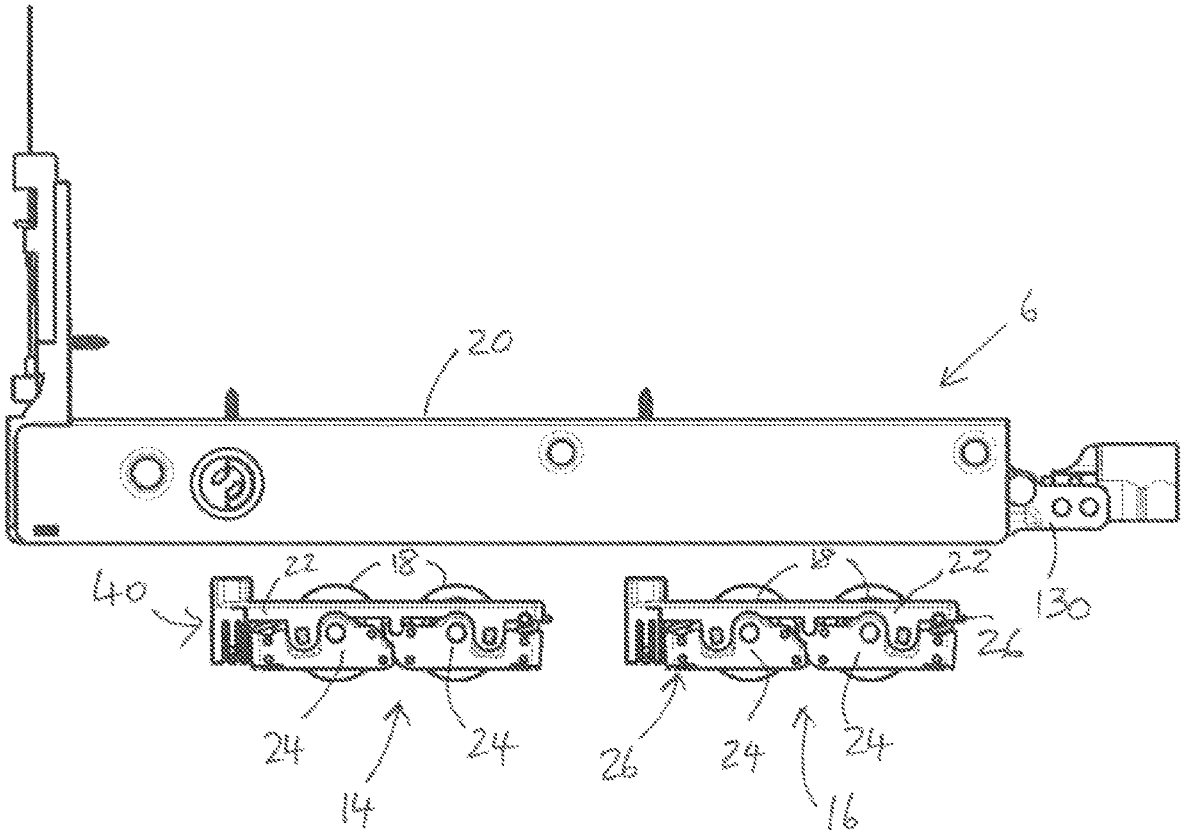
FIG. 12 is an exploded view of the first roller assembly of FIG. 2 with removable roller carriage sub-assemblies.
Figure 13:
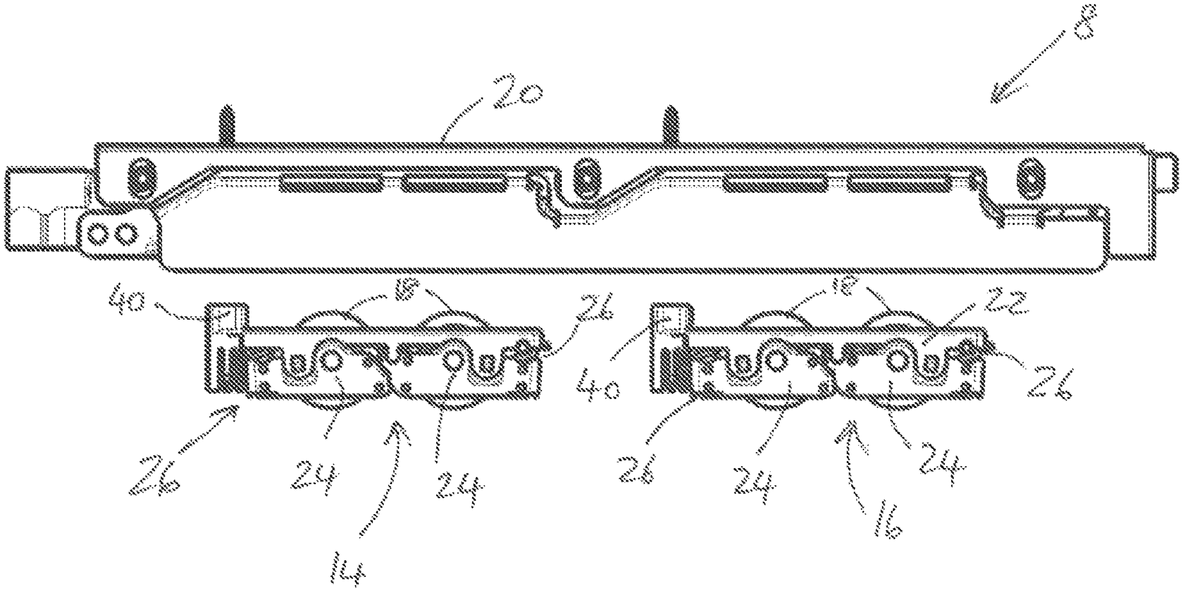
FIG. 13 is an exploded view of the second roller assembly of FIG. 3 with removable roller carriage sub-assemblies.
Figure 14:
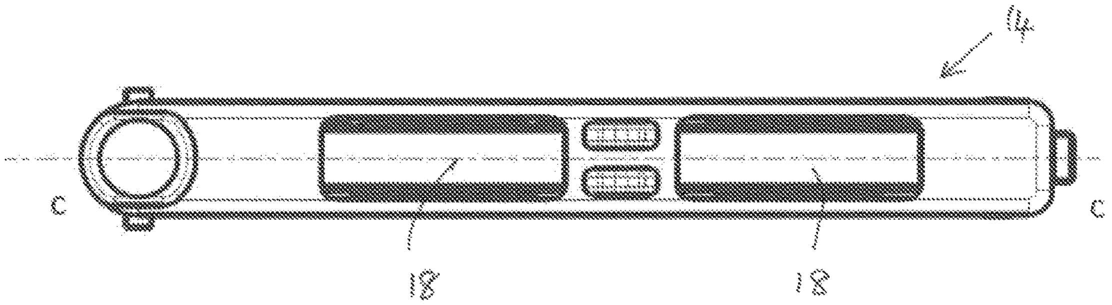
FIG. 14 is a top view of one of the removable roller carriage sub-assemblies of FIG. 12.
Figure 15:
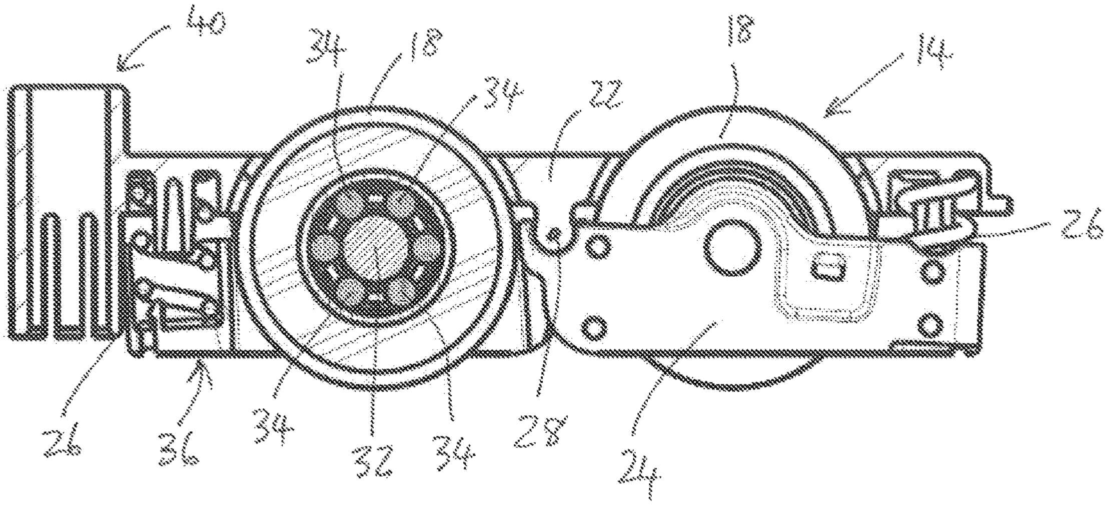
FIG. 15 is a cross-section view through line C-C of FIG. 14 of the removable roller carriage sub-assembly of FIGS. 12 and 13.
Figure 16:
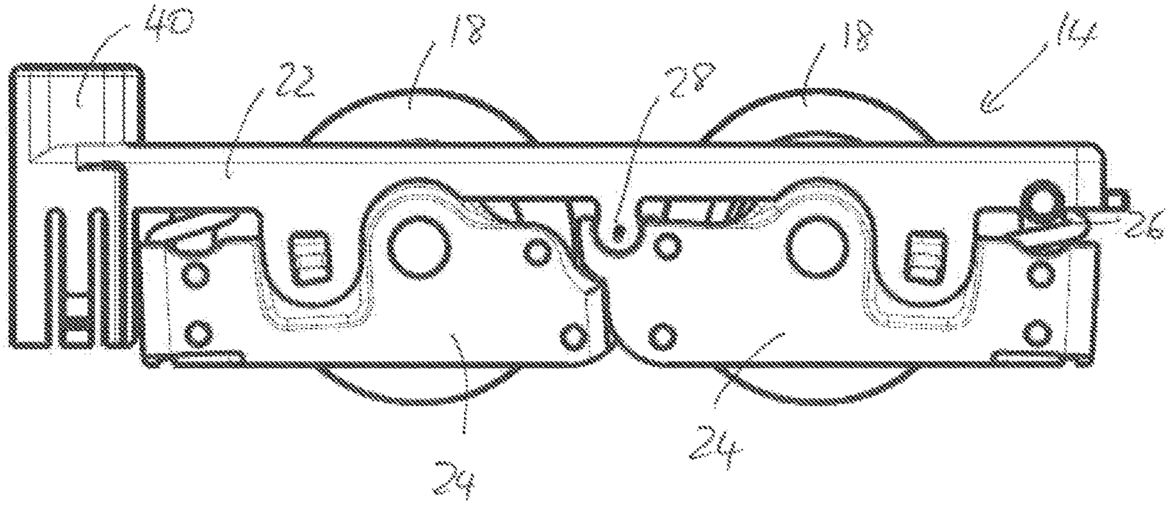
FIG. 16 is a view of the removable roller carriage sub-assembly of FIG. 14 in an unloaded condition.
Figure 17:
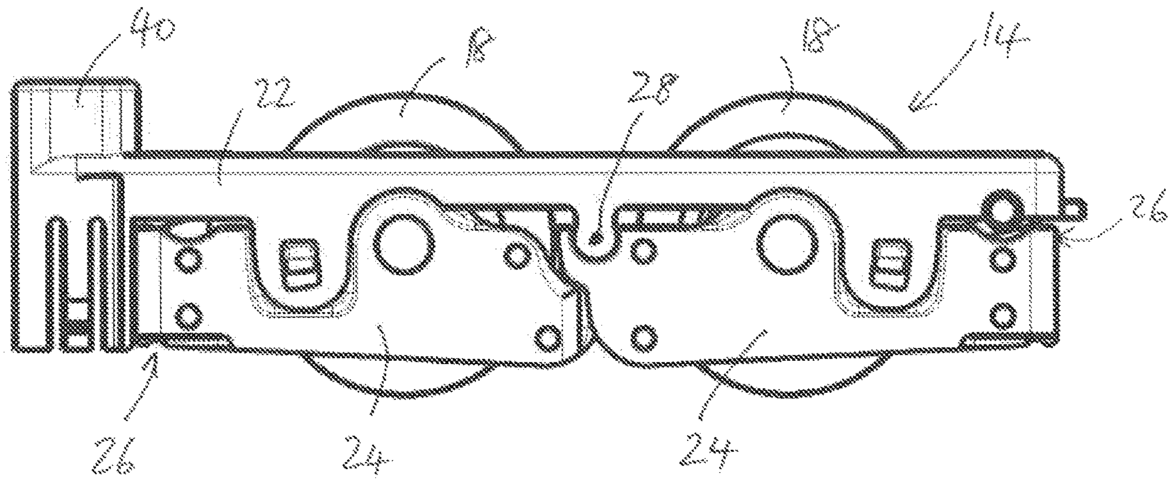
FIG. 17 is a view of the removable roller carriage sub-assembly of FIG. 14 in a loaded condition.

Referring now to FIG. 1, there is described a suspension system 2 for use with a sliding panel system having a slidable panel 4 and comprising roller assemblies 6, 8 according to preferred embodiments of the present invention which are shown in more detail in FIGS. 2 to 25. The slidable panel 4 can be a sliding door or window. In the illustrated example of FIG. 1, the sliding panel system has a pair of spaced apart roller assemblies 6, 8 connected by linking means 10 which are configured to support the panel 4 at opposite lower ends by being slidably mountable in a recessed sill of the door or window frame (not shown) which includes sealing means in the form of weather seals. The linking means 10 may comprise a linkage bar, one end of which is connected to roller assembly 6, and the other end of which is connected to roller assembly 8.

In FIGS. 2 to 10, there are shown various views of the roller assemblies 6, 8. One roller assembly 6 is a master roller assembly with the other being a slave roller assembly 8 linked thereto. The roller assemblies are shown in various configurations: retracted, extended, loaded and unloaded. The loaded condition is where the roller assemblies 6, 8 support the weight of the slidable panel 4. The roller assemblies 6, 8, and the slidable panel 4 supported thereon, are also able to be movable into raised and lowered positions by a height adjustment sealing assembly which brings the panel frame and weather seals into and out of frictional contact. The height adjustment sealing assembly shown in FIG. 1 includes a handle 3, and a linkage assembly 5 which connects the handle 3 to the master roller assembly 6. Further details of the height adjustment sealing assembly are provided in a related patent application.

The roller assemblies 6, 8, are exemplified in FIGS. 2 to 25 according to preferred embodiments of the present invention. Each roller assembly 6, 8 has a body which includes at least one roller sub-assembly 14, 16 for suspending at least one roller wheel 18.

The body of each of the roller assemblies 6, 8 includes an outer housing 20 which defines an internal volume which is sized to receive the roller sub-assemblies 14, 16, and which protects the sub-assemblies 14, 16 and further provides an aesthetic covering.

The master roller assembly 6, shown more particularly in FIGS. 2, 4 to 7 and 12, has a U-shaped outer housing 20 with an upper surface 21 and downwardly extending side walls 23.

The slave roller assembly 8, shown more particularly in FIGS. 3, 11 to 14 and 16, has an outer housing comprising an upper housing part with an upper surface 21 and a lower housing part with downwardly extending side walls 23.

The upper surface 21, of each housing 20 is provided with a pair of openings 121 through which attachment means 123 extend for securing the lower surface of the panel 4 to the roller assembly 6.

The linkage assembly 5 comprises a pair of connected upper and lower bell crank linkage arrangements 7, 9 at opposite end portions of a vertical rod member 11 extending therebetween as illustrated in FIGS. 1 and 27 to 29. The linkage assembly 5 allows an operator to rotate the handle 3 to effect movement of the sub-assemblies 14, 16 of the master and slave roller assemblies 6, 8 between their retracted and extended positions. In one position, illustrated in FIGS. 5 and 9, the roller wheels 18 are retracted into the outer housing 20 so that the roller assemblies 6, 8 are in contact with the sealing means. In the other position, the roller wheels 18 of the roller assemblies 4, 6 are extended such that the roller wheels 18 protrude beyond the outer housing 20 and the lower housing part 22 to raise the panel 4 so that it is free of the sealing means and the panel 4 can slide freely on the roller wheels 18 within the sill of the door or window frame In the roller assemblies 6, 8 the roller sub-assemblies 14, 16 are mounted to an elongate inner member 130 which is movable within the outer housing 20. A first end 131 of the inner elongate member 130 of the master roller assembly 6 is connected to the lower bell crank linkage 9, and a second end 32 of the inner member 130 is connected to a first end of the linkage bar 10. The inner member 130 is connected to the outer housing 20 by pivoting swing arms 13. In the master roller assembly 6, the swing arms 13 are located at an intermediate location between the roller sub-assemblies 14 and 16 and at an end location at the second end of the inner member 30. In the slave roller assembly 8, the swing arms 13 are located at an intermediate location between the roller sub-assemblies 14 and 16 and at opposite end locations of the inner member 130. The pivoting swing arms 13 allow each inner member 130 to move in unison horizontally and vertically relative to the outer housing 20 upon pivotal movement of the lower bell crank linkage 9. As shown in the embodiments of FIGS. 4 to 25, each roller assembly 6, 8 is configured to carry a plurality of roller wheels 18 and has a plurality of roller sub-assemblies 14, 16. Each roller sub-assembly 14, 16 includes a support 22 and a plurality of pivotal arms 24 where each pivotal arm 24 is arranged to mount a respective roller wheel 18 to allow rotational motion of the wheel 18. Each pivotal arm 24 is pivotally attached at one end to the support 22 to permit the respective roller wheel 18 to pivot relative to the support 22 in a vertical plane. The roller sub-assembly 14, 16 also includes suspension means 26 for connecting the opposite end of each pivotal arm 24 to the support 22 to allow the opposite end of the arm 24 to move resiliently relative to the support 22 when a force is applied to the roller wheel 18 by the slidable panel 4. The suspension means 26 are shown in the embodiments of FIGS. 4 to 18 as springs, specifically coil springs; however it would be understood that any type of resilient suspension means would be able to be used.

The pivotal arms 24 and suspension means 26 allow suspension of the roller wheel 18 relative to the outer housing 20 such that in use when the load of the slidable panel 4 rests on the roller assembly 6, 8, the roller wheel 18 recedes a pre-determined amount into the outer housing 20 compared to when the roller assembly 14, 16 is unloaded. The maximum pre-determined amount depends on the suspension means 26, such as the spring constant, the load in the form of the weight of the slidable panel 4 and the number of roller wheels 18 in the roller assembly 14, 16. This is particularly illustrated in FIGS. 17, 23 and 25 where the roller wheels 18 recede into the body of the roller assemblies 6, 8 in the loaded conditions compared to those of the unloaded conditions.

In one embodiment exemplified in FIGS. 5 to 18, the roller assembly 6 is configured to carry four roller wheels 18, and has a pair of roller sub-assemblies 14, each of which includes a support 22 attached to the inner housing member 130 and which can carry two roller wheels 18. Each roller sub-assembly 14 has a pair of pivotal arms 24, each pivotal arm 24 being adapted to receive a respective roller wheel 18 to allow rotational movement such that the wheels 18 can rotate to allow movement of the slidable panel 4 within the sill during operation. In this embodiment, the pivotal arms 24 of each roller sub-assembly 14,16 extend outwardly from and are pivotally attached to a common pivot point 28 of the support 22 to allow the respective roller wheel 18 to pivot in a vertical plane. Further there are suspension means 26 at each of the opposite outer end portions of the pivotal arms 24 such that when a force is applied to the sub-assembly 14, 16, the suspension means 26 compresses, the pivotal arms 24 pivot symmetrically about a vertical axis and the wheels 18 recede upwardly into the sub-assembly 14, 16.

In another embodiment exemplified in FIGS. 19 to 25, each roller assembly 6, 8 has a single roller sub-assembly 16 in which the inner housing member 130 forms a single support 22 which is configured to carry four wheels 18. The roller sub-assembly 16 includes four pivotal arms 24, each of which is adapted to receive a single roller wheel 18 to allow rotational movement so that the wheels 18 can rotate to allow the panel 4 to slide within the sill during use. Similar to the embodiment of FIGS. 5 to 18, each pivotal arm 24 is pivotally attached to the support 22 at one end and has a suspension means 26 at the opposite end of the pivotal arm 24 with the roller wheel 18 being mounted intermediate the ends. In use, the sub-assembly 16 is arranged such that the roller wheels 18 form a horizontal row, with each pivotal arm 24 forming its own suspension arrangement as the arms 24 are each pivotally attached about its own pivot 30, the four pivot points 30 being equidistantly spaced apart from each other such that the suspension means 26 is adjacent the subsequent suspension arrangement. The suspension means 26 are shown in the embodiment of FIGS. 19 to 25 as springs, specifically coil springs however it would be understood that any type of resilient suspension means would be able to be used.

Referring to FIGS. 21 to 25, instead of the swinging arms 13 of the embodiment of FIGS. 4 to 11, the sides of the outer housing 20 have four inclined slots 113. The pivot 30 for each pivotal arm 24 is received and movable within a respective slot 113, so as to allow the inner housing member 130 to move horizontally and vertically relative to the outer housing 20 upon pivotal movement of the lower bell crank linkage 9, thereby allowing the roller wheels 18 to move between their retracted and extended positions within the outer housing 20. The inner housing member 130 to the outer housing 20 can be adjusted into vertical or horizontal positions relative to each other by arrangements alternative to that described above and fixed into position by a fixing means such as a nut and bolt arrangement.

It can be understood that these embodiments are presented by example only, and the sub-assemblies 14, 16 may carry any number of roller wheels 18 and where the arms 24 carrying the roller wheels 18 can be arranged with their own pivot points or with common pivots such that the arms 24 extend in the same direction or in opposing directions.

Figure 18:
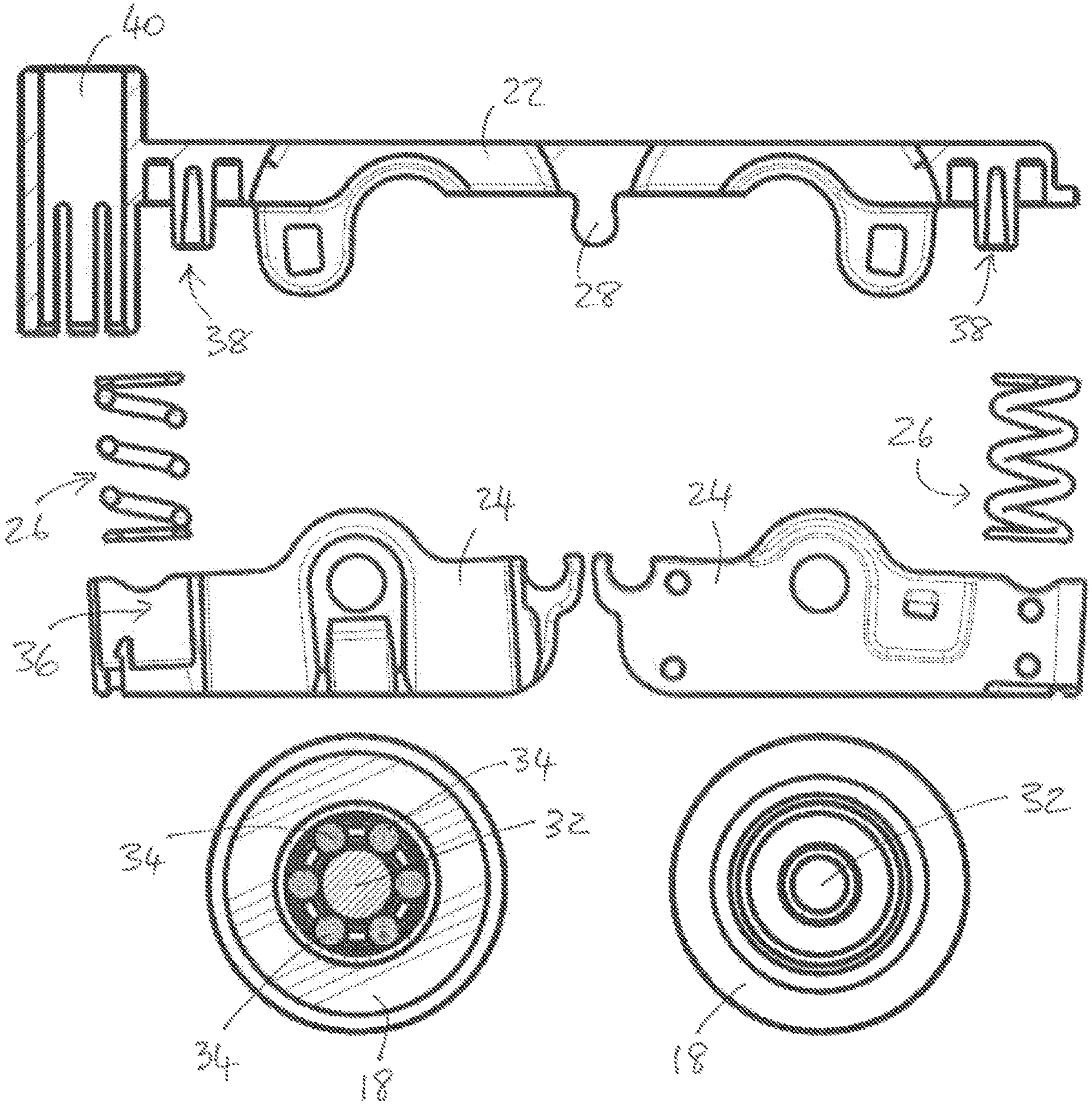
FIG. 18 is an exploded view of the removable roller carriage assembly of FIG. 14.
Figure 19:
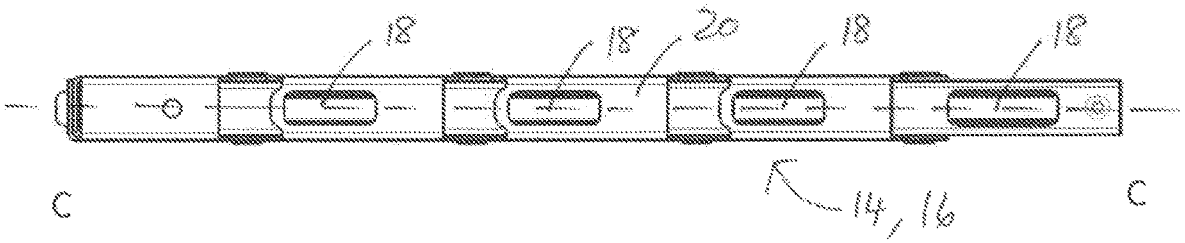
FIG. 19 is a top view of a roller assembly having alternative removable roller carriage sub-assemblies according to another embodiment of the present invention.
Figure 20:
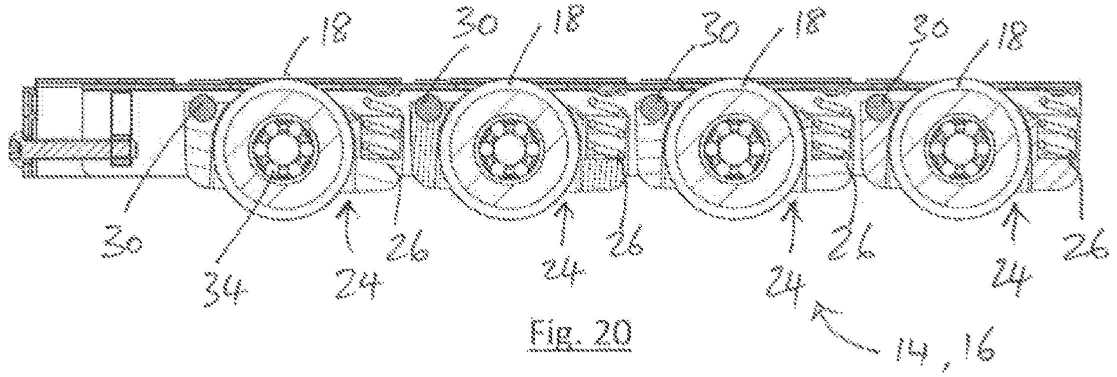
FIG. 20 is a cross-section view of the roller assembly through line C-C of the roller assembly of FIG. 19.
Figure 21:
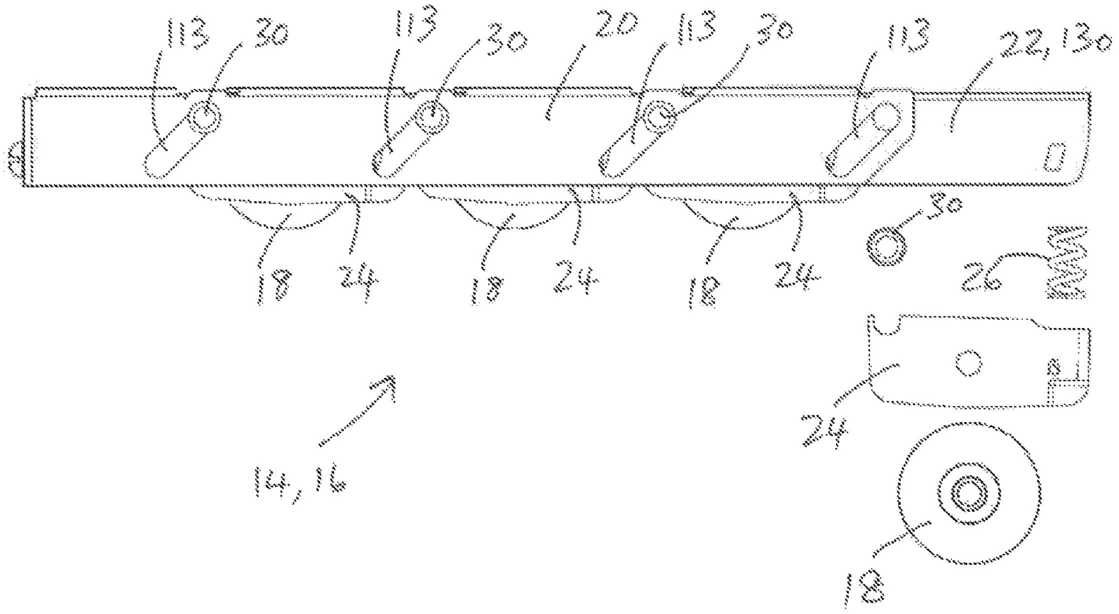
FIG. 21 is a front view of the roller assembly of FIG. 19 with an exploded view of the removable roller cartridge sub-assembly.
Figure 22:
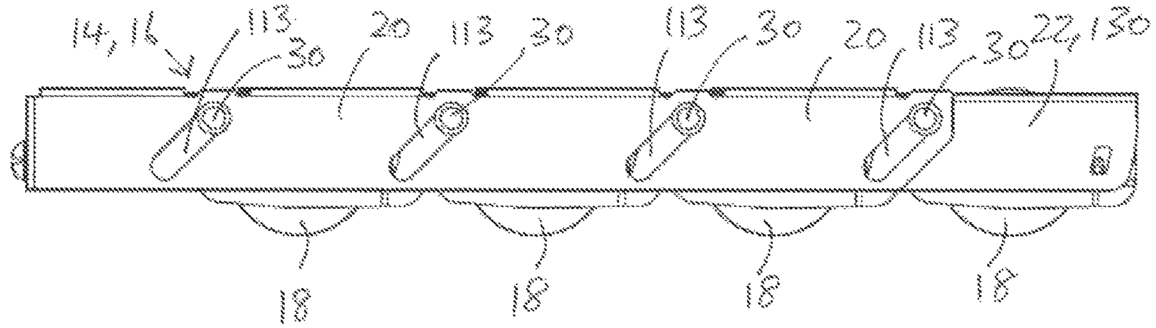
FIG. 22 is a front view of the roller assembly of FIGS. 19 and 20 in a retracted unloaded configuration.
Figure 23:
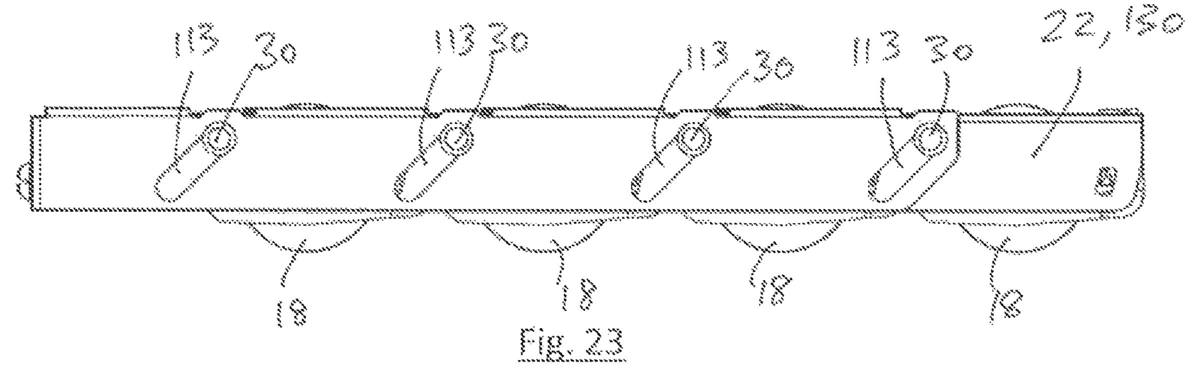
FIG. 23 is a front view of the roller assembly of FIGS. 19 and 20 in a retracted loaded configuration.
Figure 24:
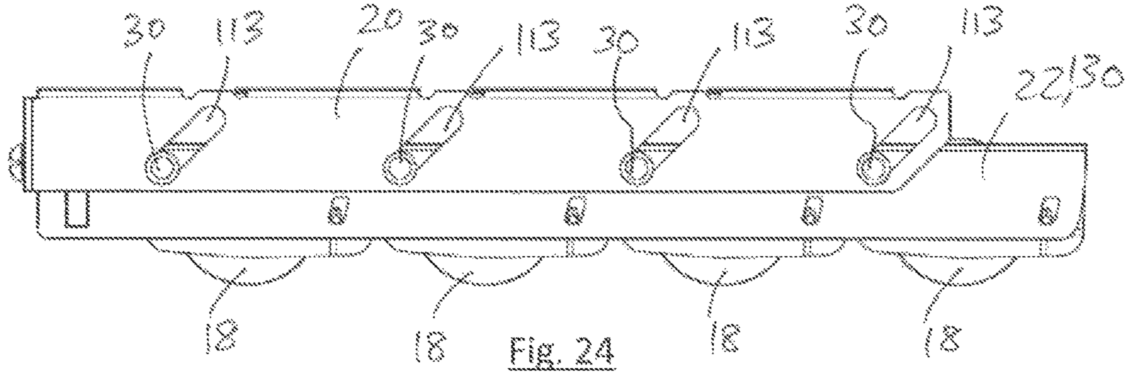
FIG. 24 is a front view of the roller assembly of FIGS. 19 and 20 in an extended unloaded configuration.
Figure 25:
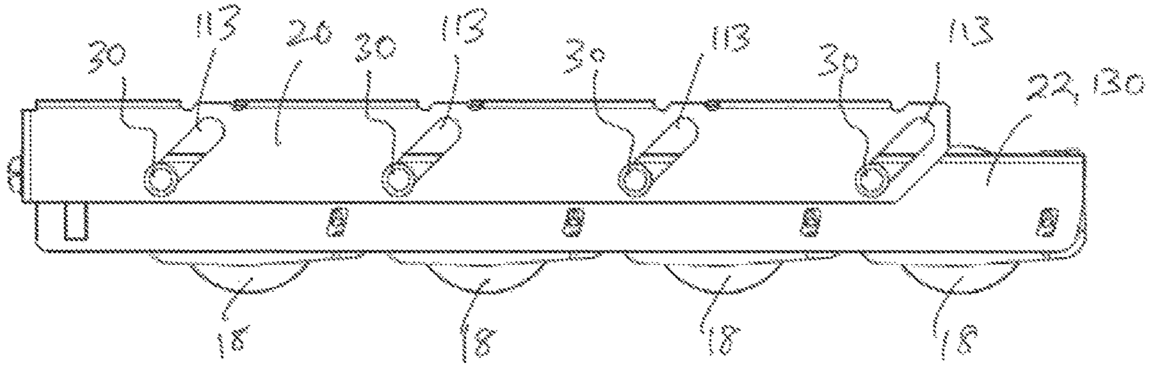
FIG. 25 is a front view of the roller assembly of FIGS. 19 and 20 in an extended loaded configuration.
Figure 26:
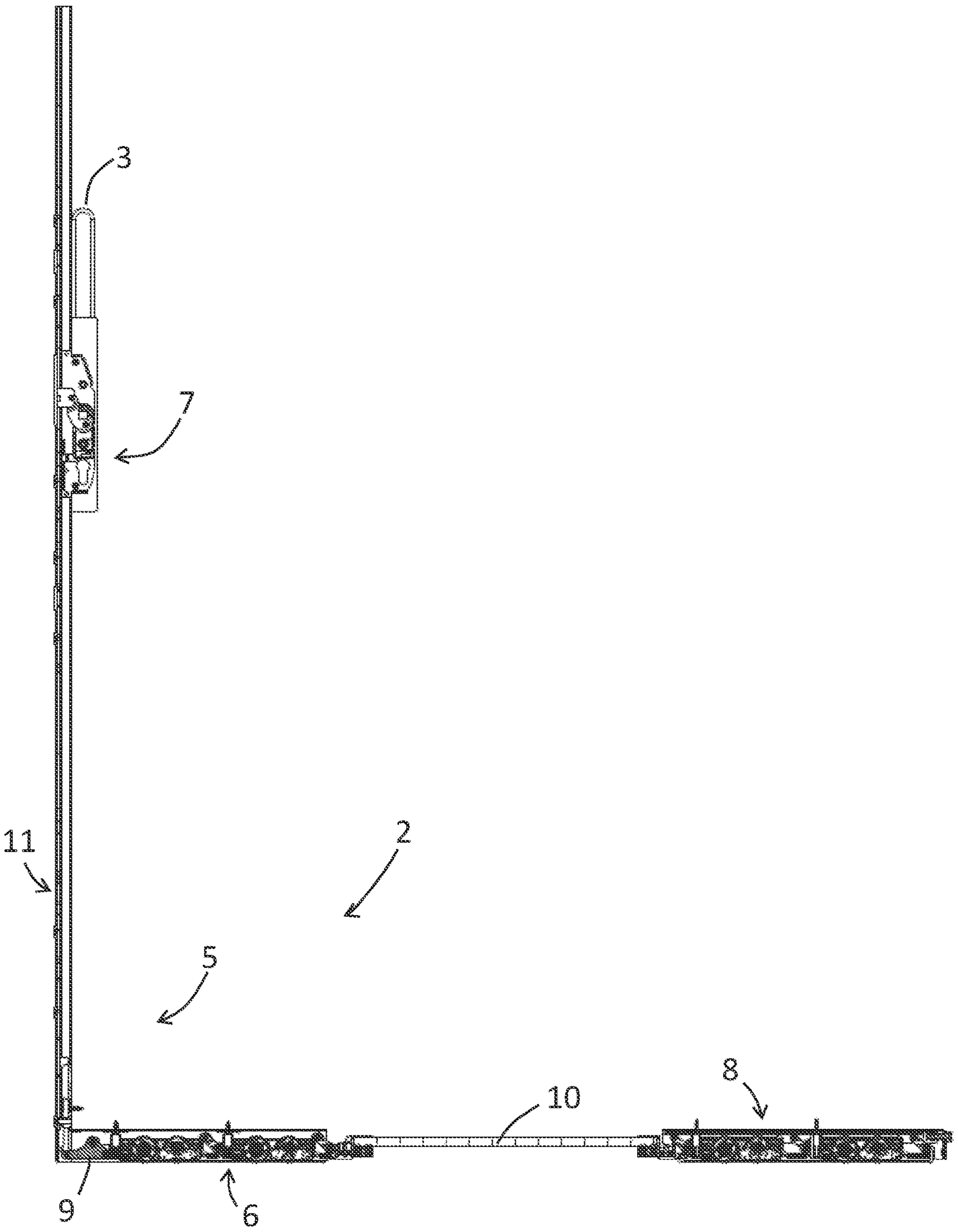
FIG. 26 is a cross-section view of the sealing assembly of FIG. 1 in a retracted configuration.
Figure 27:
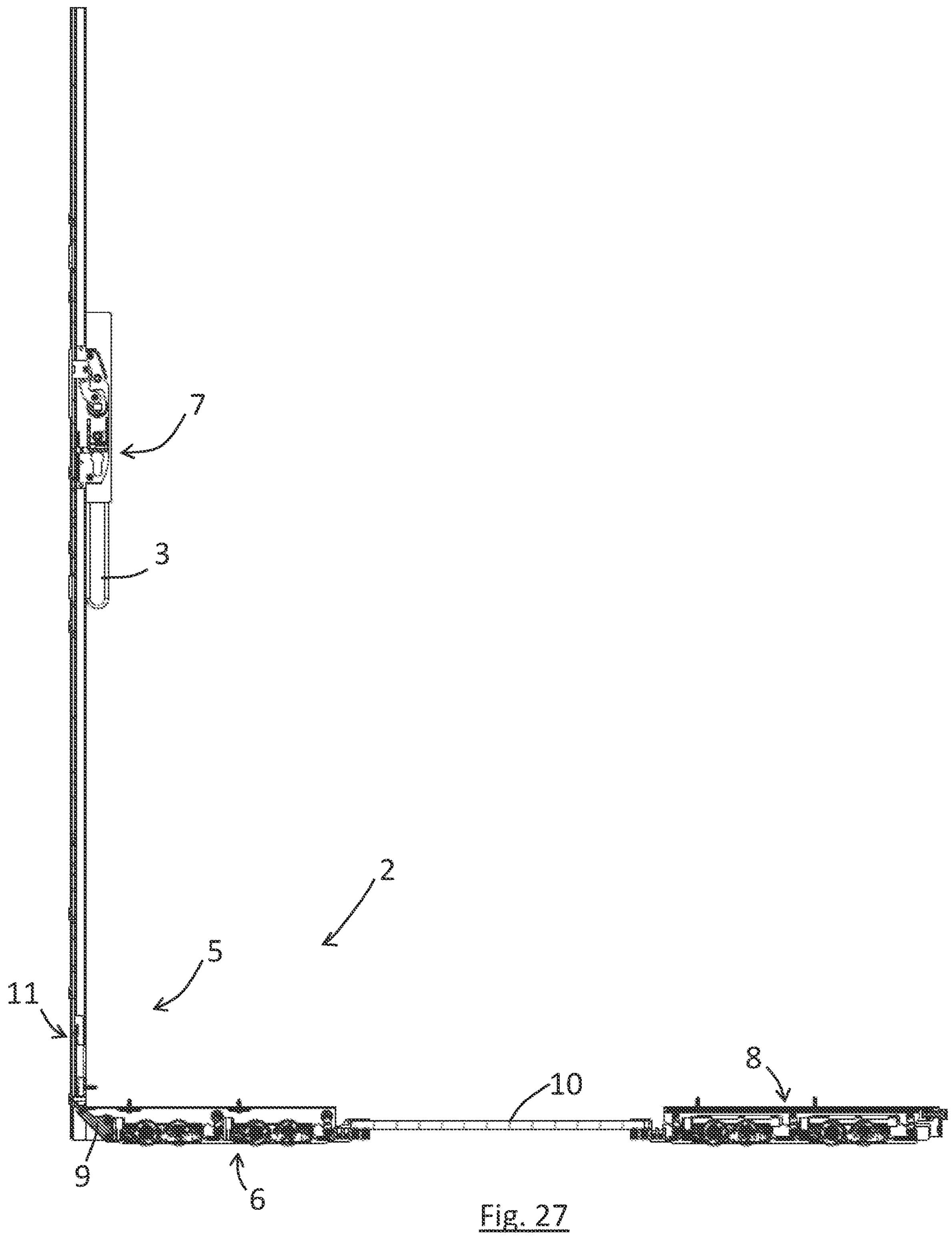
FIG. 27 is a cross-section view of the sealing assembly of FIG. 1 in an extended configuration.
Figure 28:
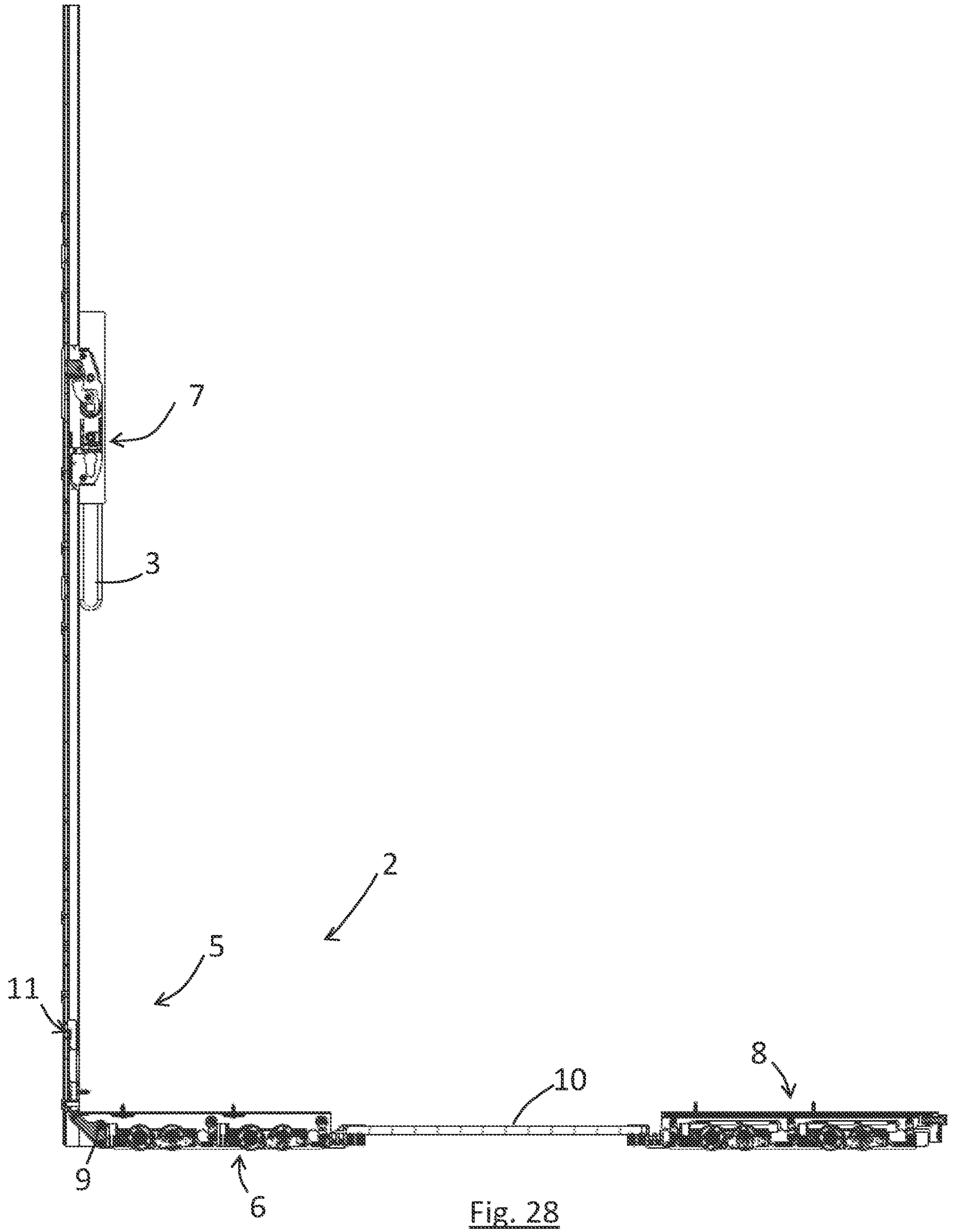
FIG. 28 is a cross-section view of the sealing assembly of FIG. 1 in an extended and loaded configuration.

Each of the roller wheels 18 includes an outer wheel surface which is adapted to engage the recessed sill when in use. The side of each roller wheel 18 can include a central aperture 32 by which the pivotal arms 24, which can be formed of a pair of parallel spaced-apart elongate plate-like members, hold the wheel 18 therebetween by inwardly directed protrusions or an axle. Each roller wheel 18, as illustrated in FIGS. 18 and 20 in cross-section, includes a plurality of internal bearings 34. The bearings 34 may reduce rotational friction and can help the wheel 18 to support radial and axial loads. Other type of roller wheels can be utilised in the roller assemblies depending on the nature of use and load to be carried by each roller wheel 18.

The support 22 of each roller-sub-assembly 14, 16 can be similarly formed to the pivotal arms 24 in that they have a pair of elongate plate-like members by which the pivotal arms 24 can be supported. The pivotal attachment of the arms 24 to the support 18 is exemplified in FIGS. 15 to 18 as a semi-circular collar and circular protrusion arrangement which allow pivotal movement, but it will be understood that any suitable pivotal arrangement could be used. At the opposite end portion of each pivotal arm 24 there is provided a recess 36 which can receive a bottom of the coil spring 26, and the top of the spring 26 can receive a downwardly directed protrusion 38 of the support 22 so as to securely retain the spring 26 without lateral movement. This is one arrangement of the connection of the suspension means 26 to the support 22 and the end portion of each pivotal arm 24, and it is envisaged that other suspension means could be utilised in place of the springs 26 to perform the same use.

In addition, each of the sub-assemblies 14, 16 described above may be configured so as to be removable from and attachable to the body of the roller assembly 6, 8. Therefore, the sub-assemblies 14, 16 may be in form of a cartridge. For instance, in the case of the embodiment illustrated in FIGS. 2 to 13, the body of each roller assembly 6, 8 is arranged so as to detachably receive the pair of roller sub-assemblies 14, 16 which can carry two roller wheels 18 each. Alternatively, as illustrated in FIGS. 19 to 25, each roller assembly 8 can hold four removably attachable sub-assemblies 14 which are each in the form of a cartridge and where each can carry a single wheel 18.

The functionality of the removably attachable cartridge sub-assemblies 14, 16 allow easy replacement and maintenance of the sub-assemblies 16, 18. In addition, the removably attachable sub-assemblies 16, 18 allow the number of roller wheels 18 in the roller assembly 6, 8 to be modified as required. For instance, if heavier panels 4 are to be used, then the number of roller wheels 18 can be increased by the attachment of additional sub-assemblies 14, 16. Furthermore, the placement of the roller wheel sub-assemblies 14, 16 within the roller assembly 6, 8 can be modified so as to optimise the load distribution from the sliding panel 4 such that it is spread evenly across the roller assemblies 6, 8, and thus the roller wheels 18. Finally, a sub-assembly 14, 16 may be replaced by one with different specifications, i.e. different suspension means 26 such as different resilient means, stronger or weaker coil springs, or roller wheels with different bearings etc.

As shown in FIGS. 15 to 18, a portion 40 of the support 22 of each cartridge sub-assembly 14, 16 can be arranged so as to be received in a correspondingly sized recess portion of the inner housing member 130 of the roller assembly 6, 8 so as to ensure a tight fit (or vice versa). Alternatively, each cartridge sub-assembly 14, 16 can be fixed into the roller assembly 6, 8 by fastening means, for example a screw, although other releasable fastenings could be used such as a resilient protrusion and recess arrangement.

In the claims which follow and in the preceding description of the invention, except where the context requires otherwise due to express language or necessary implication, the word “comprise” or variations such as “comprises” or “comprising” is used in an inclusive sense, i.e. to specify the presence of the stated features but not to preclude the presence or addition of further features in various embodiments of the invention.

The invention claimed is:

1. A roller assembly for a sliding panel, the roller assembly comprising:
- an inner member;
- at least one roller sub-assembly mounted on the inner member, the at least one roller sub-assembly comprising:
- a support attached to the inner member for mounting of the at least one roller sub-assembly to the inner member;
- a first roller wheel;
- a second roller wheel;
- a first pivotal arm rotatably mounting the first roller wheel to the support by a pivot point;
- a second pivotal arm rotatably mounting the second roller wheel to the support by the pivot point so that the second pivotal arm pivots about a horizontal axis extending through the pivot point;
- a first resilient suspension means; and
- a second resilient suspension means;
- wherein the first pivotal arm has a first end which is pivotally attached to the support and a second end opposite the first end, wherein the first resilient suspension means extends between the second end and the support to allow resilient pivotal movement of the second end relative to the support when a force is applied to the first roller wheel so that the first pivotal arm, the first resilient suspension means and the first roller wheel form a first suspension arrangement,
- wherein the second pivotal arm has a third end which is pivotally attached to the support and a fourth end opposite to the third end, wherein the second resilient suspension means extends between the fourth end and the support to allow resilient pivotal movement of the fourth end relative to the support when a force is applied to the second roller wheel so that the second pivotal arm, the second resilient suspension means and the second roller wheel form a second suspension arrangement,
- wherein the first roller wheel has a first axis extending through the centre of the first roller wheel and the second roller wheel has a second axis extending through the centre of the second roller wheel, and the at least one roller sub-assembly holds the first and second roller wheels in parallel alignment where the first axis of the first roller wheel is parallel to and spaced apart from the second axis of the second roller wheel.

2. The roller assembly according to claim 1, wherein the first roller wheel is rotatably mounted intermediate the first and second ends of the first pivotal arm, and the second roller wheel is rotatably mounted intermediate the third and fourth ends of the second pivotal arm.

3. The roller assembly according to claim 1, further comprising an outer housing.

4. The roller assembly according to claim 3, wherein the roller sub-assembly is one of a pair of roller sub-assemblies within the outer housing of the roller assembly.

5. The roller assembly according to claim 3, wherein the support of the roller sub-assembly holds four roller wheels.

6. The roller assembly according to claim 1, wherein the first resilient suspension means is a spring and the second resilient suspension means is a spring.

7. The roller assembly according to claim 6, wherein the first and second suspension means are each a coil spring.

8. The roller assembly according to claim 4, wherein the at least one roller sub-assembly is removable from the outer housing.

9. A roller cartridge for mounting on an inner member of a roller assembly for a sliding panel system, the roller cartridge comprising:

a support for attachment to the inner member for mounting of the roller cartridge to the inner member;

a first roller wheel;

a second roller wheel;

a first pivotal arm rotatably mounting the first roller wheel to the support by a pivot point;

a second pivotal arm rotatably mounting the second roller wheel to the support by the pivot point so that the second pivotal arm pivots about a horizontal axis extending through the pivot point;

a first resilient suspension means; and a second resilient suspension means, wherein the first pivotal arm has a first end which is pivotally attached to the support and a second end opposite to the first end, wherein the first resilient suspension means extends between the second end and the support to allow resilient pivotal movement of the second end relative to the support when a force is applied to the first roller wheel so that the first pivotal arm, the first resilient suspension means and the first roller wheel form a first suspension arrangement, wherein the second pivotal arm has a third end which is pivotally attached to the support and a fourth end opposite to the third end, wherein the second resilient suspension means extends between the fourth end and the support to allow resilient pivotal movement of the fourth end relative to the support when a force is applied to the second roller wheel so that the second pivotal arm, the second resilient suspension means and the second roller wheel form a second suspension arrangement, wherein the first roller wheel has a first axis extending through the centre of the first roller wheel and the second roller wheel has a second axis extending through the centre of the second roller wheel, and the support of the roller cartridge holds the first and second roller wheels in parallel alignment where the first axis of the first roller wheel is parallel to and spaced apart from the second axis of the second roller wheel.

10. A sealing system comprising:

a roller assembly comprising:

an inner member;

at least one roller sub-assembly mounted on the inner member, the at least one roller sub-assembly comprising:

a support attached to the inner member for mounting of the at least one roller sub-assembly to the inner member;

a first roller wheel;

a second roller wheel;

a first pivotal arm rotatably mounting the first roller wheel to the support by a pivot point;

a second pivotal arm rotatably mounting the second roller wheel to the support by the pivot point so that the second pivotal arm pivots about a horizontal axis extending through the pivot point;

a first resilient suspension means;

a second resilient suspension means; and wherein the first pivotal arm has a first end which is pivotally attached to the support and a second end opposite to the first end, wherein the first resilient suspension means extends between the second end and the support to allow resilient pivotal movement of the second end relative to the support when a force is applied to the first roller wheel so that the first pivotal arm, first resilient suspension means and first roller wheel form a first suspension arrangement, wherein the second pivotal arm has a third end which is pivotally attached to the support and a fourth end opposite to the third end, wherein the second resilient suspension means extends between the fourth end and the support to allow resilient pivotal movement of the fourth end relative to the support when a force is applied to the second roller wheel so that the second pivotal arm, the second resilient suspension means and the second roller wheel form a second suspension arrangement, a linkage assembly which connects a handle to the roller assembly, wherein the sealing system is configured to be adjustable, by manipulation of the handle, such that the roller assembly and a slidable panel supported by the roller assembly are movable between a first position where the slidable panel is in contact with sealing means thereby providing weatherproofing and a second position where the slidable panel is free from contact with the sealing means and the panel is able to move freely relative to an outer frame.

11. The sealing system according to claim 10, wherein the linkage assembly is configured to provide a variable force when the roller assembly and the slidable panel are moved between the positions.

12. The sealing system according to claim 10, having at least a pair of roller assemblies wherein the roller assemblies are spaced apart and mountable in a recess of a sill for supporting the slidable panel.

* * * * *